(12) United States Patent
Sunano

(10) Patent No.: US 6,689,508 B2
(45) Date of Patent: Feb. 10, 2004

(54) NONAQUEOUS ELECTROLYTE SECONDARY CELL AND METHOD OF PRODUCING THE SAME

(75) Inventor: Taizo Sunano, Sumoto (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 272 days.

(21) Appl. No.: 09/820,930

(22) Filed: Mar. 30, 2001

(65) Prior Publication Data

US 2001/0038941 A1 Nov. 8, 2001

(30) Foreign Application Priority Data

Mar. 31, 2000 (JP) .......................... 2000-098409

(51) Int. Cl.7 .......................... H01M 2/14; H01M 10/40
(52) U.S. Cl. ...................... 429/144; 429/145; 429/303; 29/623.4
(58) Field of Search ................. 429/144, 145, 429/163, 176, 300, 303, 246, 247, 249; 29/623.1, 623.4

(56) References Cited

U.S. PATENT DOCUMENTS 6,225,010 B1 * 5/2001 Hamano et al. ............ 429/306
6,387,565 B1 * 5/2002 Aihara et al. ............... 429/145

FOREIGN PATENT DOCUMENTS

| JP | 11-219728 | 8/1999 |
| JP | 2000-067917 | 3/2000 |
| JP | 2000-306569 | 11/2000 |
| JP | 2000-323121 | 11/2000 |

* cited by examiner

*Primary Examiner*—Randy Gulakowski
*Assistant Examiner*—Jonathan Crepeau
(74) *Attorney, Agent, or Firm*—Westerman, Hattori, Daniels & Adrian, LLP

(57) ABSTRACT

The present invention provides a nonaqueous electrolyte secondary cell having a construction wherein a flat spiral-shaped electrode assembly, in which positive and negative electrodes capable of intercalating and deintercalating lithium ions are wound with a separator disposed therebetween, is enclosed in a casing which changes shape with a slight increase in the internal pressure of the cell, a gel polymer containing a nonaqueous liquid electrolyte exists between the positive electrode and the separator, bonding the positive electrode and the separator, and the adhesive strength between the separator and the positive electrode is 0.02 N/10 mm or higher. In the above construction of a nonaqueous electrolyte secondary cell, even when the cell is overcharged and gas is generated in the cell, explosion caused by detachment of the bonded portion of the positive electrode and the separator is prevented.

17 Claims, 2 Drawing Sheets

NONAQUEOUS ELECTROLYTE SECONDARY CELL AND METHOD OF PRODUCING THE SAME

BACKGROUND OF THE INVENTION (1) Field of the Invention

The present invention relates to a nonaqueous electrolyte secondary cell having a construction wherein a flat spiral-shaped electrode assembly, in which positive and negative electrodes capable of intercalating and deintercalating lithium ions are wound with a separator disposed therebetween, is enclosed in a casing which changes shape with a slight increase in the internal pressure of the cell, and a gel polymer containing a nonaqueous liquid electrolyte exists between the positive electrode and the separator, bonding the positive electrode and the separator. The present invention also relates to a method of producing the same.

(2) Description of the Prior Art

Conventionally, only materials composed of metals such as stainless steel have been used for the casings of nonaqueous electrolyte cells. However, in cells that utilize this kind of casing, the casing made of metal must be thick, and along with this the cell mass increases. As a result, difficulty in reducing the thickness of the cell and at the same time, a decline in the mass energy density of the cell, were problems.

In an attempt to overcome these problems, the inventors of the present invention made an aluminum laminated film, being composed of resin layers formed on both surfaces of a metal layer comprising aluminum with adhesive layers disposed therebetween, into a pouch to construct a laminated casing, and proposed a thin cell having an electrode assembly enclosed in the enclosure space of this laminated casing. With a cell having this kind of construction, there are the advantages of remarkable reduction in the thickness of the cell and furthermore of an increase in the mass energy density of the cell.

However, because the casing of a cell utilizing the above-described laminated casing is more flexible than that of a cell utilizing a metal casing, the cell utilizing the laminated casing has the following disadvantages when overcharged. When the cell is overcharged to about 200% of cell capacity, the liquid electrolyte and the gel polymer begin to oxidize and decompose at the positive electrode, gas is generated, and consequently the temperature of the cell begins to rise. Due to the generating of gas, the bonded portion of the positive electrode and the separator begins to detach, overvoltage arises (the effective area of the electrode decreases), and the charge rate per unit area increases, resulting in partial shutdown of the separator. In this kind of state, because, when charging is continued, the effective area of the electrode further decreases inviting more current concentration on the electrode plates, an abnormal amount of heat is generated in portions of the electrode plates. Consequently, because the separator melts and a short circuit results, a decline in the safety of the cell becomes a problem.

SUMMARY OF THE INVENTION

Therefore, it is an object of the present invention to provide a nonaqueous electrolyte secondary cell intended to improve safety through prevention of a short circuit in the cell caused by detachment of the bonded portion of the positive electrode and the separator, even when the cell is overcharged and gas is generated.

It is another object of the present invention to provide a method of producing a nonaqueous electrolyte secondary cell in which the nonaqueous electrolyte secondary cell intended to improve safety can be easily prepared.

These and other objects are accomplished in one aspect of the invention by providing a nonaqueous electrolyte secondary cell comprising:

a flat spiral-shaped electrode assembly comprising a positive electrode, a negative electrode, and a separator disposed therebetween, the positive electrode and negative electrode being capable of intercalating and deintercalating lithium ions, and the electrode assembly being enclosed in a casing which changes shape with a slight increase in the internal pressure of the cell; and a gel polymer containing a nonaqueous liquid electrolyte, the gel polymer existing between the positive electrode and the separator and bonding the positive electrode and the separator;

wherein the adhesive strength between the separator and the positive electrode is 0.02 N/10 mm or higher.

The overcharge level (the level of current at which problems do not arise during overcharging) in a cell, as shown in the Formula (1) below, is proportional to stack strength (the adhesive strength between the positive electrode and the separator) and is inversely proportional to the amount of gas generated. Therefore, if the adhesive strength between the positive electrode and the separator is 0.02 N/10 mm (2 gf/10 mm) or higher as in the above construction, even when the cell is overcharged, oxidation and decomposition of the liquid electrolyte and the gel begins at the positive electrode, and gas is generated, because the stack strength is large, detachment of the bonded portion of the positive electrode and the separator is suppressed. Thus, because it is possible to ensure prevention of a shutdown of the separator caused by a reduction in the effective area of the electrode, or a short circuit in the cell caused by the melting of the separator, the overcharge level increases.

$$\text{Overcharging level} \propto \frac{(\text{stack strength})}{(\text{amount of gas generated})} \qquad (1)$$

$$\propto \frac{(\text{surface area of separator}) * (\text{strength of gel polymer})}{1/(\text{oxidation potential of gel polymer})}$$

$$\propto \frac{[1/(\text{porosity of separator})] * (\text{proportion of polymer in gel})}{1/(\text{oxidation potential of gel polymer})}$$

In another aspect of the invention, the casing is a laminated casing.

In another aspect of the invention, the porosity of the separator is 60% or less and the proportion of polymer component in the gel polymer is 5 mass % or more.

As shown in the above Formula 1, the stack strength is inversely proportional to the porosity of the separator, and proportional to the proportion of the polymer component in the gel polymer (in Formula 1, this is abbreviated as proportion of polymer in gel). Through experiments carried out by the inventors of the present invention, it was found that when the porosity of the separator is 60% or less, and the proportion of polymer component in the gel polymer is 5 mass % or more, the adhesive strength between the positive electrode and the separator is 0.02 N/10 mm or higher. Therefore, it is preferable that the porosity of the separator and the proportion of the polymer component in the gel polymer be fixed as in the above aspect of the invention.

In another aspect of the invention, the porosity of the separator is 45% or higher and the proportion of polymer component in the gel polymer is less than 30 mass %.

The porosity of the separator and the proportion of polymer component in the gel polymer are fixed in this way because when the porosity of the separator is less than 45% and the proportion of polymer component in the gel polymer is 30 mass % or higher, although the adhesive strength between the positive electrode and the separator becomes very strong, cell characteristics such as the discharge characteristic deteriorate. Therefore, it is preferable that the porosity of the separator and the proportion of the polymer component in the gel polyester be fixed as in the above aspect of the invention.

In another aspect of the invention, the oxidation potential of the gel polymer is 4.8 V or higher versus $Li/Li^+$.

As shown in the Formula 1, the amount of gas generated is inversely proportional to the oxidation potential of the gel polymer. Through experiments carried out by inventors of the present invention, it was found that when the oxidation potential of the gel polymer is 4.8 V or higher versus $Li/Li^+$, it is possible to sufficiently control the amount of gas generated. Therefore, it is preferable that the oxidation potential of the gel polymer be fixed as in the above aspect of the invention.

In addition, the objects of the invention are accomplished, in another aspect of the invention, by providing a method of producing a nonaqueous electrolyte secondary cell comprising the steps of:

preparing an electrode assembly having a flat spiral-shape by winding a positive electrode and a negative electrode with a separator disposed therebetween, the positive electrode and the negative electrode being capable of intercalating and deintercalating lithium ions;

enclosing the electrode assembly in a casing which changes shape with a slight increase in the internal pressure of the cell; and putting together the positive electrode, separator, and the negative electrode such that after a pregel comprising a liquid electrolyte and a polymer precursor is poured into the casing, the pregel crosslinks and polymerizes by heating to form a gel, and the adhesive strength between the positive electrode and the separator is 0.02 N/10 mm or higher.

With the above-described method of production, a nonaqueous electrolyte secondary cell according to the present invention can be easily prepared.

DESCRIPTION OF THE PREFERRED EMBODIMENTS

The examples of the present invention are explained below referring to FIGS. 1 to 4.

EXAMPLE 1

Figure 1:
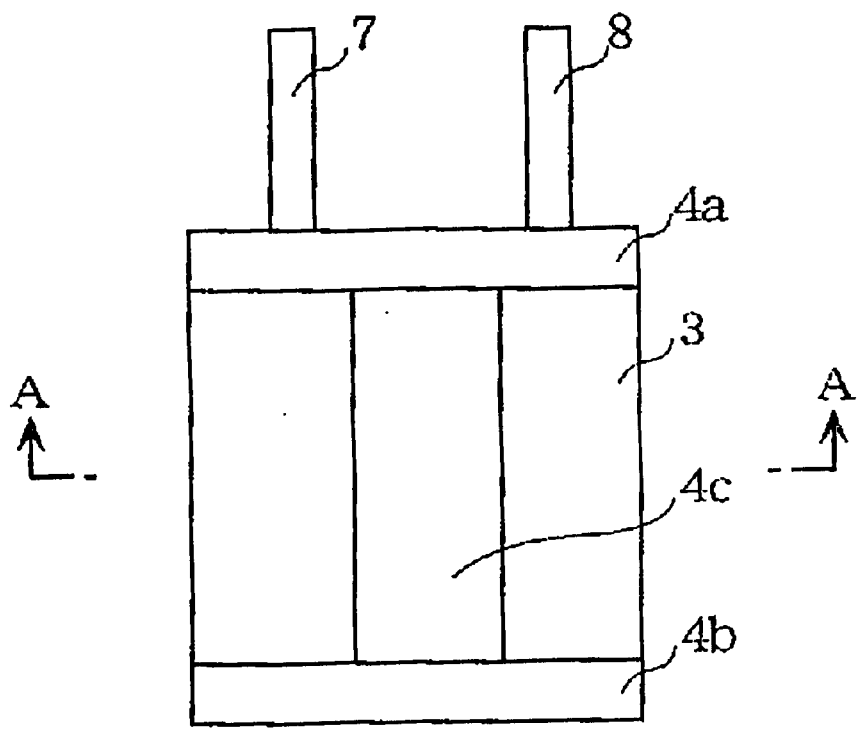
FIG. 1 is a front view of a nonaqueous electrolyte secondary cell according to the present invention.
Figure 2:
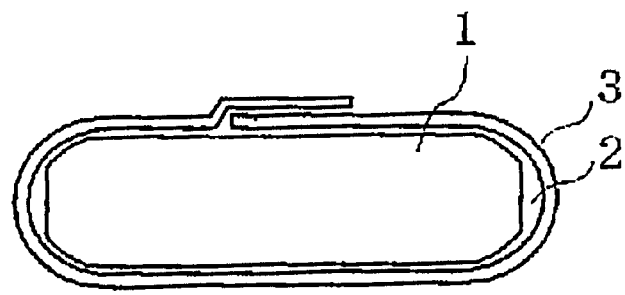
FIG. 2 is a cross sectional view of FIG. 1 taken along line A—A.
Figure 3:
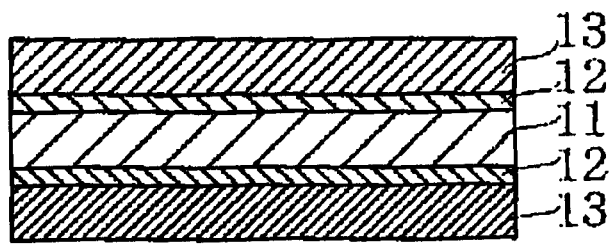
FIG. 3 is a cross sectional view of a laminated casing utilized in a nonaqueous electrolyte secondary cell according to the present invention.
Figure 4:
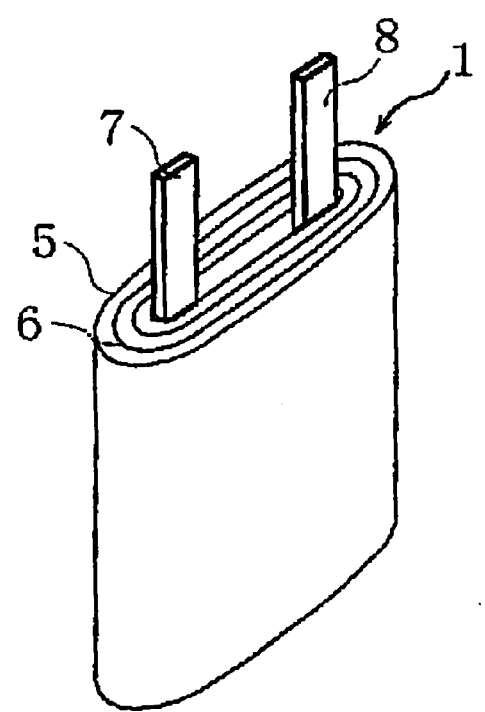
FIG. 4 is a perspective view of an electrode assembly utilized in a nonaqueous electrolyte secondary cell according to the present invention.

FIG. 1 is a front view of a nonaqueous electrolyte secondary cell according to the present invention, FIG. 2 is a cross sectional view of FIG. 1 taken along line A—A, FIG. 3 is a cross sectional view of a laminated casing utilized in a nonaqueous electrolyte secondary cell according to the present invention, and FIG. 4 is a perspective view of an electrode assembly utilized in a nonaqueous electrolyte secondary cell according to the present invention.

As shown in FIG. 2, a thin cell of the present invention comprises an electrode assembly 1 placed in an enclosure space 2. This enclosure space 2, as shown in FIG. 1, is formed by sealing the upper edge portion, lower edge portion, and central portion of a laminated casing 3 with sealing parts 4a, 4b, and 4c respectively. As shown in FIG. 4, the electrode assembly 1 is prepared by winding a positive electrode 5, composed mainly of a positive electrode active material comprising $LiCoO_2$, a negative electrode 6, composed mainly of a negative electrode active material comprising natural graphite, and a separator (not shown in FIG. 4) for separating the electrodes, into a flat spiral-shape.

A gel polymer exists between the positive electrode 5 and the separator and between the negative electrode 6 and the separator. This gel polymer is formed by adding $LiPF_6$ and $LiN(C_2F_5SO_2)_2$, serving as electrolyte salts, at a mole ratio of 5:95, to a mixed solvent comprising 30 mass % ethylene carbonate (EC) and 70 mass % diethyl carbonate (DEC) and mixing to form a liquid electrolyte, mixing a pregel comprising polyethylene glycol diacrylate with the liquid electrolyte, and then heating and polymerizing this mixture. It is to be noted that the oxidation potentials of the ethylene carbonate and the diethyl carbonate versus $Li/Li^+$ were determined by using CV (cyclic voltammetry) and were approximately 4.9 V and 5.0 V respectively.

As shown in FIG. 3, the basic construction of the laminated casing 3 is one in which resin layers 13 (thickness: 30 μm) comprising polypropylene are bonded to both sides of aluminum layer 11 (thickness 30 μm) by means of adhesive layers 12 (thickness: 5 μm) comprising denatured polypropylene disposed therebetween.

The positive electrode 5 is attached to a positive electrode lead 7 comprising aluminum, and the negative electrode 6 is attached to a negative electrode lead 8 comprising nickel, making the construction one in which chemical energy generated in the cell can be released as electrical energy outside the cell.

A cell having the above-described construction is prepared as follows.

Preparation of the Positive Electrode

First, 90 mass % of a positive electrode active material comprising $LiCoO_2$, 5 mass % of a carbon-based conductivity enhancer comprising acetylene black, graphite, and the like, sand 5 mass % of a binder comprising polyvinylidene fluoride (PVDF), were dissolved in an organic solvent comprising N-methylpyrrolidone, and the solution was mixed to prepare an active material slurry or an active material paste.

Next, after the active material slurry or the active material paste was uniformly applied to both surfaces of a positive electrode substrate (thickness: 20 μm) comprising aluminum foil or aluminum mesh by using for example, a die coater or a doctor blade in the case of a slurry and for example, the roll coating method in the case of a paste, this positive electrode substrate was dried in a dryer eliminating the organic solvent that was necessary in the preparation of the slurry or paste. Then, by rolling this electrode plate with a roller press, the positive electrode 5 having a thickness of 0.17 mm was prepared.

Preparation of the Negative Electrode

First, a negative electrode active material comprising natural graphite ($d_{(002)}$=3.36 Å) and a binder comprising polyvinylidene fluoride (PVDF) were dissolved in an organic solvent comprising N-methylpyrrolidone and the solution was mixed to prepare an active material slurry or an active material paste. Next, after the active material slurry or the active material paste was uniformly applied to all of both surfaces of a negative electrode substrate (thickness: 20 μm) comprising copper foil by using for example, a die coater or a doctor blade in the case of a slurry and for example, the roll coating method in the case of a paste, this negative electrode substrate was dried in a dryer eliminating the organic solvent that was necessary in the preparation of the slurry or paste. Then, by rolling this electrode plate with a roller press, the negative electrode 6 having a thickness of 0.14 mm was prepared.

Preparation of the Electrode Assembly

After the positive electrode lead 7 and the negative electrode lead 8 were fixed to the positive electrode 5 and the negative electrode 6 prepared as described above respectively, both electrodes 5 and 6 were put together with a separator composed of a microporous film (thickness: 0.025 mm, porosity: 50%) comprising polyolefin-based resin, which has low reactivity with organic solvents and is inexpensive, disposed therebetween. At this time, the center lines in the direction of the widths of both the positive and the negative electrodes were lined up. Then, the flat spiral-shaped electrode assembly 1 was prepared by winding the electrodes with a winding machine and taping down the outermost coil.

Preparation of the Cell

First, after preparing a sheet of aluminum laminated film, near edge portions of the sheet were put together and then these portions were welded to form the sealing portion 4c. Next, the electrode assembly 1 was enclosed in the enclosure space 2 of this tube-shaped aluminum laminated film. The electrode assembly 1 was arranged so that both current collector tabs 7 and 8 projected from one of the openings of the tube-shaped aluminum laminated film. Next, with the current collector tabs in this position, the aluminum laminated film at the opening from which the current collector tabs 7 and 8 projected was welded and sealed to form the sealing part 4a. Here, a high-frequency induction welding device was used.

Next, after a pregel, comprising a liquid electrolyte and polyethylene glycol diacrylate (70 mass % liquid electrolyte, 30 mass % polyethylene glycol diacrylate), the liquid electrolyte having been prepared by adding $LiPF_6$ and $LiN(C_2F_5SO_2)_2$, serving as electrolyte salts, at a mole ratio of 5:95, to a mixed solvent comprising 30 mass % ethylene carbonate and 70 mass % diethyl carbonate and mixing, was poured in the enclosure space 2, the edge portions of the aluminum laminated film on the opposite side from sealing part 4a were welded to form a sealing part 4b. Finally the pregel inside the laminated casing was crosslinked and polymerized by heating the laminated casing to form a gel, and a nonaqueous electrolyte secondary cell was prepared.

A cell prepared in this way is hereinafter referred to as cell A1 of the present invention.

EXAMPLES 2 TO 13

Except for changing at least one of the mixed solvent shown in Table 1, the pregel shown in Table 1, or the porosity of the separator shown Table 2, cells were prepared in the same way as Example 1.

Cells prepared in this way are hereinafter referred to as cell A2 to A13 of the present invention respectively.

COMPARATIVE EXAMPLES 1 TO 7

Except for changing at least one of the mixed solvent shown in Table 1, the pregel shown in Table 1, or the porosity of the separator shown in Table 2, cells were prepared in the same way as Example 1.

Cells prepared in this way are hereinafter referred to as comparative cells X1 to X7 respectively.

TABLE 1

| Polymer | Mixed solvent (proportion) | Pregel (proportion) | Cell |
|---|---|---|---|
| I | ethylene carbonate (30 mass %) + diethyl carbonate (70 mass %) | polyethylene glycol diacrylate (30 mass %) + liquid electrolyte (70 mass %) | A1 A4 A7 A10 A13 |
| II | ethylene carbonate (30 mass %) + diethyl carbonate (70 mass %) | polyethylene glycol diacrylate (10 mass %) + liquid electrolyte (90 mass %) | A2 A5 A8 A11 X5 |
| III | ethylene carbonate (80 mass %) + diethyl carbonate (60 mass %) + ethyl acetate (10 mass %) | polyethylene glycol diacrylate (10 mass %) + liquid electrolyte (90 mass %) | A3 A6 A9 A12 X6 |
| IV | ethylene carbonate (30 mass %) + diethyl carbonate (70 mass %) | polyethylene glycol diacrylate (3 mass %) + liquid electrolyte (97 mass %) | X1 X2 X3 X4 X7 |

TABLE 2

| | Porosity of separator | Polymer | Adhesive strength (N/10 mm) | Overcharging at 500 mA | Overcharging at 1000 mA | Overcharging at 1500 mA | Discharge Characteristic 1000 mA/ 100 mA |
|---|---|---|---|---|---|---|---|
| Cell A4 | 40% | I | 0.0352 | 3/3 OK | 3/3 OK | 3/3 OK | 10% |
| Cell A5 | | II | 0.0242 | 3/3 OK | 3/3 OK | 3/3 OK | 40% |
| Cell A6 | | III | 0.0240 | 3/3 OK | 1/3 OK | 1/3 OK | 70% |

TABLE 2-continued

| | Porosity of separator | Polymer | Adhesive strength (N/10 mm) | Overcharging at 500 mA | Overcharging at 1000 mA | Overcharging at 1500 mA | Discharge Characteristic 1000 mA/ 100 mA |
|---|---|---|---|---|---|---|---|
| Cell X2 | | IV | 0.0092 | 1/3 OK | 0/3 OK | 0/8 OK | 60% |
| Cell A7 | 45% | I | 0.0339 | 3/3 OK | 3/3 OK | 3/3 OK | 15% |
| Cell A8 | | II | 0.0233 | 3/3 OK | 3/3 OK | 3/3 OK | 60% |
| Cell A9 | | III | 0.0230 | 3/3 OK | 1/3 OK | 0/3 OK | 80% |
| Cell X3 | | IV | 0.0090 | 0/3 OK | 0/3 OK | 0/3 OK | 70% |
| Cell A1 | 50% | I | 0.0335 | 3/3 OK | 3/3 OK | 3/3 OK | 20% |
| Cell A2 | | II | 0.0228 | 3/3 OK | 3/3 OK | 3/3 OK | 75% |
| Cell A3 | | III | 0.0225 | 3/3 OK | 1/3 OK | 0/3 OK | 85% |
| Cell X1 | | IV | 0.0089 | 0/3 OK | 0/3 OK | 0/3 OK | 80% |
| Cell A10 | 60% | I | 0.0320 | 3/3 OK | 3/3 OK | 3/3 OK | 25% |
| Cell A11 | | II | 0.0217 | 3/3 OK | 3/3 OK | 3/3 OK | 80% |
| Cell A12 | | III | 0.0213 | 1/3 OK | 0/3 OK | 0/3 OK | 90% |
| Cell X4 | | IV | 0.0088 | 0/3 OK | 0/3 OK | 0/3 OK | 85% |
| Cell A13 | 70% | I | 0.0283 | 3/3 OK | 3/3 OK | 3/3 OK | 30% |
| Cell X5 | | II | 0.0186 | 1/3 OK | 1/3 OK | 0/3 OK | 85% |
| Cell X6 | | III | 0.0184 | 0/3 OK | 0/3 OK | 0/3 OK | 35% |
| Cell X7 | | IV | 0.0082 | 0/3 OK | 0/3 OK | 0/3 OK | 90% |

Experiment 1

After a thermocouple was fixed to the cell surfaces of the cells A1 to A13 of the present invention and the comparative cells X1 to X7, overcharging tests were conducted wherein the cells were charged for 3 hours at a constant current of 500 mA, 1000 mA, and 1500 m A respectively. The results of the tests are shown together with Table 2 above. The number of samples for each test was 3 cells.

As is clearly shown in Table 2 above, while a plurality of cell defects appeared in the comparative cells X1 to X7 during overcharging, in the cells A1 to A13 of the present invention either no defects appeared or a small number of defects appeared during overcharging. In particular, in the cells A1 to A12 of the present invention, as adhesive strength increased, change in the shape of the wound electrode assembly was kept to a minimum during overcharging. The reason for this is thought to be that because detachment between the positive electrode and the separator becomes more difficult and it is possible to control reduction in the effective area of the electrode, cell defects caused by current concentration can be prevented.

After further investigation, it was found that with the cells A1, A2, A4, A5, A7, A8, A10, and A11 of the present invention in which the porosity of the separators was 60% or less and the polymers were either I or II, the adhesive strength was 0.02 N/10 mm or higher and no defects appeared in the cells. On the other hand, when the porosity of the separators was 70%, although with the cell A13 of the present invention in which the polymer was I, the adhesive strength was 0.02 N/10 mm or higher and defects did not appear, with the comparative cell X5 in which the polymer was II, the adhesive strength was 0.02 N/10 mm or less and defects appeared in the cell. Therefore, in improving overcharge protection, it is preferable that the porosity of the separator be 60% or less.

In addition, in the comparative cells X1 to X4 and X7 which used polymer (IV) having a proportion of polyethylene glycol diacrylate (polymer component) of 3 mass %, it is recognized that the adhesive strengths of all the cells were less than 0.02 N/10 mm. Therefore, it is preferable that the proportion of polymer component exceed 3 mass %, and while it is not shown in Table 2 above, when the proportion of polymer component was 5 mass % or higher, an increase in adhesive strength was confirmed by experiment. Thus, in improving overcharge protection, it is preferable that the proportion of polymer component be 5 mass % or higher.

Furthermore, in the cells A3, A6, A9, and A12 of the present invention in which polymer (III) comprising a liquid electrolyte containing ethyl acetate (EA) was used, although the adhesive strength was 0.02 N/10 mm or higher, the appearance of cell defects was confirmed. The reason for this is thought to be that because the oxidation potential of ethyl acetate (EA) versus $Li/Li^+$ is low (approximately 4.6 V when measured by CV), gas is generated at an earlier stage, and thus detachment of the bonded portion of the positive electrode and the separator begins to occur at an earlier stage and current concentration is brought about. Therefore, for the gel polymer, it is preferable to use a substance with a high oxidation potential (particularly, 4.8 V or higher).

Experiment 2

The cells A1 to A13 of the present invention and the comparative cells X1 to X7 were charged according to the conditions described below and a discharge characteristic was investigated. The results are shown together with Table 2 above. It is to be noted that the discharge characteristic was calculated from the expression, discharge capacity when discharged at a current of 1000 mA/discharge capacity when discharged at a current of 100 mA×100 (%).

Charging Conditions

Under the conditions of constant current-constant voltage charging, cells are charged at a constant current of 500 mA until a voltage of 4.2 V is reached, and then charging is changed to constant voltage charge, the charging being complete after a total of 3 hours.

Discharging Conditions

Cells are discharged at a current of 100 mA and at a current of 1000 mA, until cell voltages of 2.7 V are reached respectively.

As is clearly shown in Table 2, in the cells A1, A4, A7, A10, and A13 of the present invention which used polymer (I) and performed well in the overcharging tests, a deterioration in the discharge characteristic was recognized. The cause of this is thought to be that because the polymer component in the gel polymer of these cells was high (30 mass %), the ion conductivity rate decreased. Therefore, in preventing deterioration in the discharge characteristic, it is preferable that the polymer component in the gel polymer be kept under 30 mass %.

In addition, when polymer (II) was used, in the cells A2, A8, and A11 of the present invention in which the porosity of the separators was 45% or higher, a good discharge characteristic was exhibited, but in the cell A5 of the present invention in which the porosity of the separator was 40%, a deterioration in the discharge characteristic was recognized. The cause of this is thought to be that because the porosity of the separator in the cell A5 of the present invention was too low, the internal resistance of tie cell increased. Therefore, in preventing deterioration in the discharge characteristic, it is preferable that the porosity of the separator be fixed at 45% or higher.

SUPPLEMENTARY REMARKS (1) For the positive electrode material, in addition to $LiCoO_2$ used above, for example, $LiNiO_2$, $LiMn_2O_4$, or complex compounds of these substances, or conductive polymers such as polyaniline, polypyrrole, and the like, can be suitably used. For the negative electrode material, in addition to the natural graphite used above, carbon black, coke, glassy carbon, carbon fiber, the baked form of these substances, and the like, can be suitably used.

(2) Solvents are not limited to those solvents used above, and it is possible to use solvents in which solutions with a comparatively high relative permittivity such as propylene carbonate, vinylene carbonate, and γ-butyrolactone, and solvents with a low viscosity and low boiling point such as diethyl carbonate, methyl ethyl carbonate, tetrahydrofuran, 1,2-dimethoxyethane, 1,3-dioxolane, 2-methoxytetrahydrofuran, and diethyl ether, are mixed at a suitable ratio. However, from the standpoint of controlling the generation of gas, it is preferable that a solvent with an oxidation potential of 4.8 V or higher versus $Li/Li^+$ be used. In addition, electrolyte salts are not limited to $LiPF_6$ or $LiN(C_2F_5SO_2)_2$ used above, and it is possible to use electrolyte salts such as $LiN(CF_3SO_2)_2$, $LiClO_4$, and $LiBF_4$.

(3) For the polymer component, in addition to the polyethylene glycol diacrylate used above, for example, polyalkylene glycol diacrylate (a specific example being polypropylene glycol diacrylate), polyalkylene glycol dimethacrylate (specific examples being polyethylene glycol dimethacylate and polypropylene glycol dimethacrylate), ether-based polymers, carbonate-based polymers, acrylonitrile-based polymers, and copolymers comprising two or more of these polymers, or crosslinked polymers, fluorine-based polymers, and the like, can be suitably used.

(4) The resin layers of the laminated casing are not limited to the polypropylene used above, and other examples include polyolefin-based polymers such as polyethylene, polyester-based polymers such as polyethylene terephtalate, polyvinylidene-based polymers such as polyvinylidene fluoride and polyvinylidene chloride, polyamide-based polymers such as nylon 6, nylon 66, and nylon 7, and the like. In addition, the construction of the laminated casing is not limited to the above-described five-layer construction.

(5) The casing is not limited to a laminated casing, and a casing that changes shape with a slight increase in the internal pressure of the cell can of course be applied to the present invention.

What is claimed is:

1. A nonaqueous electrolyte secondary cell comprising:
   an electrode assembly comprising a positive electrode, a negative electrode, and a separator disposed therebetween, the positive electrode and negative electrode being capable of intercalating and deintercalating lithium ions, and the electrode assembly being enclosed in a casing which changes shape with a slight increase in the internal pressure of the cell; and
   a gel polymer containing a nonaqueous liquid electrolyte, the gel polymer existing between the positive electrode and the separator and bonding the positive electrode and the separator;
   wherein the adhesive strength between the separator and the positive electrode is in a range of from 0.02 N/10 mm to 0.0283 N/10 mm.

2. A nonaqueous electrolyte secondary cell according to claim 1, wherein the electrode assembly is such that the positive electrode and the negative electrode are wound to form a flat spiral-shape.

3. A nonaqueous electrolyte secondary cell according to claim 1, wherein the casing is a laminated casing.

4. A nonaqueous electrolyte secondary cell according to claim 2, wherein the casing is a laminated casing.

5. A nonaqueous electrolyte secondary cell according to claim 1, wherein the porosity of the separator is 60% or less and the proportion of polymer component in the gel polymer is 5 mass % or more.

6. A nonaqueous electrolyte secondary cell according to claim 3, wherein the porosity of the separator is 60% or less and the proportion of polymer component in the gel polymer is 5 mass % or more.

7. A nonaqueous electrolyte secondary cell according to claim 5, wherein the porosity of the separator is from 45% to 60% and the proportion of polymer component in the gel polymer is in a range of from 5 mass % to less than 30 mass %.

8. A nonaqueous electrolyte secondary cell according to claim 6, wherein the porosity of the separator is from 45% to 60% and the proportion of polymer component in the gel polymer is in a range of from 5 mass % to less than 30 mass %.

9. A nonaqueous electrolyte secondary cell according to claim 1, wherein the oxidation potential of the gel polymer is 4.8 V or higher versus $Li/Li^+$.

10. A nonaqueous electrolyte secondary cell according to claim 2, wherein the oxidation potential of the gel polymer is 4.8 V or higher versus $Li/Li^+$.

11. A nonaqueous electrolyte secondary cell according to claim 3, wherein the oxidation potential of the gel polymer is 4.8 V or higher versus $Li/Li^+$.

12. A nonaqueous electrolyte secondary cell according to claim 4, wherein the oxidation potential of the gel polymer is 4.8 V or higher versus $Li/Li^+$.

13. A nonaqueous electrolyte secondary cell according to claim 5, wherein the oxidation potential of the gel polymer is 4.8 V or higher versus $Li/Li^+$.

14. A nonaqueous electrolyte secondary cell according to claim 6, wherein the oxidation potential of the gel polymer is 4.8 V or higher versus $Li/Li^+$.

15. A nonaqueous electrolyte secondary cell according to claim 7, wherein the oxidation potential of the gel polymer is 4.8 V or higher versus $Li/Li^+$.

16. A nonaqueous electrolyte secondary cell according to claim 8, wherein the oxidation potential of the gel polymer is 4.8 V or higher versus $Li/Li^+$.

17. A method of producing a nonaqueous electrolyte secondary cell comprising the steps of:
   preparing an electrode assembly having a flat spiral-shape by winding a positive electrode and a negative electrode with a separator disposed therebetween, the positive electrode and the negative electrode being capable of intercalating and deintercalating lithium ions;

enclosing the electrode assembly in a casing which changes shape with a slight increase in the internal pressure of the cell; and putting together the positive electrode, separator, and the negative electrode such that after a pregel comprising a liquid electrolyte and a polymer precursor is poured into the casing, the pregel crosslinks and polymerizes by heating to form a gel, and the adhesive strength between the positive electrode and the separator is in a range of from 0.02 N/10 mm to 0.0283 N/10 mm.

* * * * *

UNITED STATES PATENT AND TRADEMARK OFFICE
CERTIFICATE OF CORRECTION

PATENT NO. : 6,689,508 B2
DATED : February 10, 2004
INVENTOR(S) : Taizo Suzano

It is certified that error appears in the above-identified patent and that said Letters Patent is hereby corrected as shown below:

Column 4,
Line 56, delete "sand" and insert -- and --.

Column 7 and 8,
Table 2, Cell X2 under the heading of Overcharging at 1500mA, delete "0/8 OK" and insert -- 0/3 OK --
Table 2, Cell X6 under the heading of Discharge Characteristic 1000 mA/100mA, delete "35%" and insert -- 95% --.

Column 9,
Line 11, delete "tie" and insert -- the --.

Signed and Sealed this

Twentieth Day of July, 2004

JON W. DUDAS
*Acting Director of the United States Patent and Trademark Office*